United States Patent [19]

Katagiri et al.

[11] Patent Number: 4,969,611

[45] Date of Patent: Nov. 13, 1990

[54] MAGNETIC TAPE CASSETTE

[75] Inventors: Shingo Katagiri; Shozo Onmori; Masaaki Seto, all of Kanagawa, Japan

[73] Assignee: Fuji Photo Film Co., Ltd., Kanagawa, Japan

[21] Appl. No.: 414,231

[22] Filed: Sep. 29, 1989

[30] Foreign Application Priority Data

Oct. 13, 1988 [JP] Japan .......................... 63-132769[U]
Oct. 14, 1988 [JP] Japan .......................... 63-133478[U]

[51] Int. Cl.⁵ ........................ G11B 15/32; G11B 23/04
[52] U.S. Cl. ..................................... 242/198; 360/132
[58] Field of Search ................ 242/197, 198, 199, 200; 360/132

[56] References Cited

U.S. PATENT DOCUMENTS 4,728,056 3/1988 Onmori et al. ...................... 242/198
4,788,614 11/1988 Onmori et al. .................. 242/198 X
4,789,113 12/1988 Katagiri et al. ...................... 242/198

Primary Examiner—Daniel P. Stodola
Assistant Examiner—William G. Battista, Jr.
Attorney, Agent, or Firm—Sughrue, Mion, Zinn, Macpeak & Seas

[57] ABSTRACT

A magnetic tape cassette, particularly, a digital audio tape cassette, having an improved hub brake structure. The cassette includes upper and lower casing body half portions, and a window member secured to the upper casing body half portion. The window portion rotatably supports the pair of hubs on which a tape is wound. The hub brake includes a pair of lugs engageable with the hubs to prevent their rotation when the cassette is not in use. The hub brake is provided with a pair of engaging portions slidably received between respective support portions of the window member and the upper casing body half portion of slidably mounting the hub brake thereon. A spring urges the hub brake into engagement with the hubs.

3 Claims, 3 Drawing Sheets

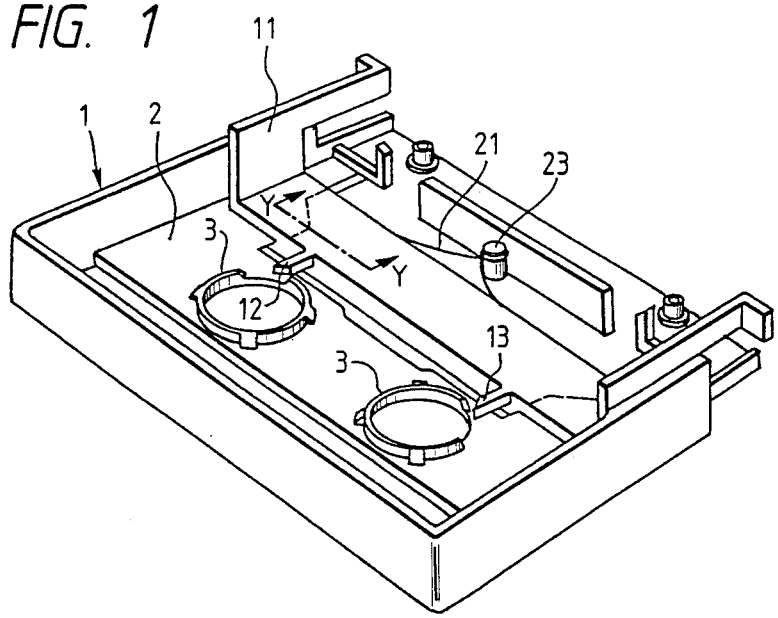
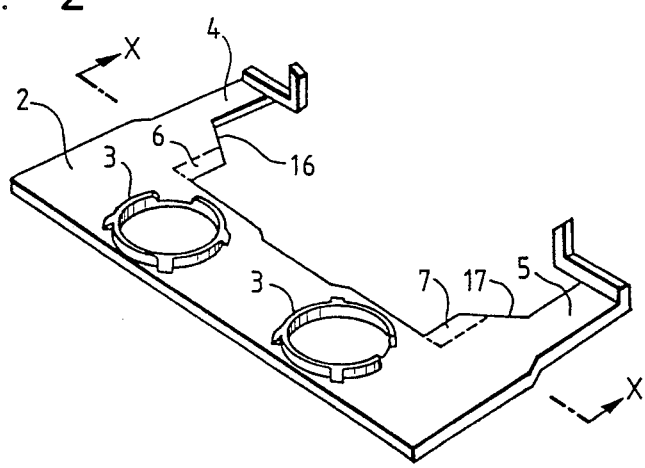
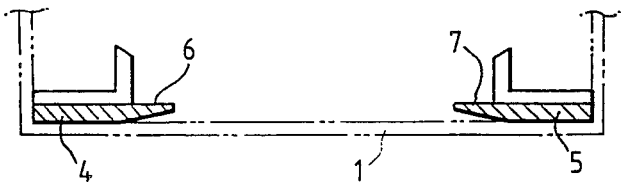

MAGNETIC TAPE CASSETTE

BACKGROUND OF THE INVENTION

The present invention relates to a magnetic tape cassette, particularly to a magnetic tape cassette generally referred to as digital audio tape (DAT) cassette.

Recently, the size and weight of cassette tape recorders have been reduced, and magnetic tape cassettes for such recorders made compact. For such applications, audio magnetic tapes capable of recording and playback with good quality and at a high density and having a long recording/playing time have been strongly desired. A digital audio tape, for which an input signal is subjected to digital processing such as pulse code modulation prior to recording, is well known as a tape which meets the above requirement.

In a digital audio tape cassette, the range of recorded signal frequencies is about five times as wide as that of a conventional compact audio tape cassette. The digital audio tape cassette has a mechanism which enables the cassette to be used together with a rotary head. This mechanism includes a guard panel which closes over the front opening of the cassette and opens upward therefrom. The guard panel is provided to protect the tape from dust which, were it to enter the cassette and cling to the tape, would degrade the performance of the tape since the wavelength of the recorded signals on a digital audio tape is much shorter than for the conventional compact audio tape cassette.

Also, because the size of the digital audio tape cassette is much smaller than that of the conventional compact audio tape cassette, the digital audio tape cassette is likely to be carried outdoors more often than a conventional compact audio tape cassette. For this and other reasons, the digital audio tape cassette requires some means for preventing the tape from unwinding due to vibration of the cassette during transport. For this purpose, the digital audio tape cassette is provided with a hub brake to check the rotation of the hubs on which the tape is wound when the tape is not in use. The hub brake is urged toward the hubs by a spring so that sharp-edged lugs of the hub brake contact the hubs when the cassette is not in use. The lugs are moved out of contact with the hubs when the tape is to be recorded on or reproduced.

A digital audio tape cassette as discussed above is disclosed in Japanese Unexamined Published Utility Model Application No. 84787/88.

However, since such cassettes are small in size, it is not easy to assemble the components thereof. The hub brake is especially difficult to assemble due to the spring, and it often falls out of the cassette during assembly. Therefore, the assembly efficiency of the cassette is low.

Digital audio tape cassettes in which an engagement device is provided between the upper half portion of the casing body of the cassette and the hub brake to improve the ease of assembly of the cassette have been proposed in Japanese Unexamined Published Utility Model Applications Nos. 67374/87 and 69879/87 and Japanese Unexamined Published Patent Application No. 134874/87. However, such an engagement device, which is provided between the upper half portion of the casing body of the cassette and a flat portion of the hub brake, can readily contact the side edge of the wound magnetic tape, causing damage to the tape or placing an undesirable load on the tape. If such loading occurs, the tape cannot be run at the prescribed speed to properly perform recording and playback.

The present invention was achieved in order to solve the above-mentioned problems.

Accordingly, it is an object of the present device to provide a magnetic tape cassette having a hub brake for preventing the hubs of the cassette from moving which can be easily assembled and which does not interfere with the normal running of the tape.

SUMMARY OF THE INVENTION

A magnetic tape cassette provided in accordance with the present invention includes a window member which is secured to the upper half portion of the casing body of the cassette and by which a pair of hubs on which the magnetic tape is wound are rotatably supported, and a hub brake urged toward the upper half portion of the casing body of the cassette by a spring so that the hub brake can be selectively engaged with the hubs to prevent their rotation and disengaged therefrom to release them. The inventive magnetic tape cassette is characterized in that the engaging portions of the hub brake, which are formed at the top thereof, are engaged with the support portions of the window member so that the engaging portions are slidably supported between the upper half portion of the casing body of the cassette and the support portions, and the engaging portions are disengaged from the support portions when the hub brake is located at the front half part of the cassette, out of the range of operation of the hub brake, which corresponds in position to the support portions.

When the magnetic tape cassette is to be assembled, the hub brake is placed at the front half part of the inside surface of the upper half portion of the casing body of the cassette and then horizontally moved toward the rear of the cassette so that the engaging portions of the hub brake are easily engaged with the support portions of the window member. After the cassette is assembled, the hub brake cannot be moved up and down relative to the casing body of the cassette and can only slide toward the front and rear of the cassette within the range of operation of the hub brake.

In accordance with another embodiment of the invention, there is provided a magnetic tape cassette which includes a window member secured to the upper half portion of the casing body of the cassette and by which a pair of hubs on which the magnetic tape is wound are rotatably supported, and a hub brake urged toward the upper half portion of the casing body of the cassette by a spring so that the hub brake can be engaged with the hubs to prevent them from rotating and disengaged therefrom to release them. This magnetic tape cassette is characterized in that the engaging portions of the hub brake, which are formed at the top thereof, are slidably supported between the upper half portion of the casing body of the cassette and the support portions of the window member, which are formed near both ends thereof, and the inside surface of the upper half portion of the casing body is provided with a lug for arching the central portion of the hub brake toward the inner portion of the interior of the cassette at the front half part thereof when the hub brake is out of the range of operation thereof.

To assemble the magnetic tape cassette, the hub brake is first placed at the front half part of the inside surface of the upper half portion of the casing body and then urged toward the inside surface near both ends of the hub brake so that the central portion of the brake is elastically deformed toward the inner part of the interior of the cassette by the lug. At that time, the side edges of the engaging portions of the hub brake are oriented toward the top of the cassette so that the engaging portions can be easily engaged with the support portions of the window member. After the cassette is assembled, the hub brake cannot be moved up and down relative to the casing body of the cassette and can only be slid toward the front and rear of the cassette within the range of operation of the hub brake.

BRIEF DESCRIPTION OF THE DRAWINGS

FIG. 1 is a partial perspective view of a magnetic tape cassette constructed according to the present invention;

FIG. 2 is a perspective view of a window member of the cassette of FIG. 1;

FIG. 3 is a sectional view of the window member taken along a line X—X in FIG. 2;

DESCRIPTION OF THE PREFERRED EMBODIMENTS

Figure 4:
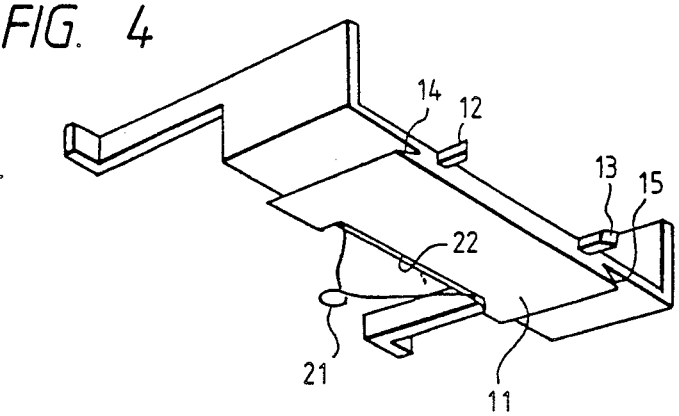
FIG. 4 is a perspective view of the hub brake of the cassette.

Preferred embodiments of the present device are hereafter described in detail with reference to the attached drawings.

FIG. 1 is a partial perspective view of a magnetic tape cassette constructed according to a first embodiment of the invention. A hub brake 11 and a window member 2 are provided on the upper half portion 1 of the casing body of the cassette as shown in FIG. 1. The window member 2 is secured in a prescribed position to the inside surface of the upper half portion 1 by ultrasonic fuse-bonding, for example.

As shown in FIG. 2, the window member 2 is formed with a pair of bearing portions 3 by which a pair of hubs (not shown) are supported at the upper edges of the hubs. The window member 2 has right and left arms 4 and 5 extending toward the front of the cassette, which have respective support portions 6 and 7 for slidably supporting the hub brake 11.

As shown in FIG. 3, each of the support portions 6 and 7 has a wedge shape in cross section so that the top of each of the support portions extends obliquely downward to the side edge of the bottom of the support portion and also appropriately toward the front of the cassette. Accordingly, a wedge-shaped opening is defined between the inside surface of the upper half portion 1 of the casing body of the cassette and each of the support portions 6 and 7.

As shown in FIG. 2, the arms 4 and 5 have notches 16 and 17 for receiving the hub brake 11. The notches 16 and 17 are located at the side edges of the arms 4 and 5 next to the support portions 6 and 7 of the window member 2, and extend from the support portions toward both the right and left ends of the cassette.

As shown in FIG. 4, the hub brake 11 has a pair of sharp-edged lugs 12 and 13 at the rear of the brake which can be moved into contact with the outer circumferential projecting edges of the hubs to prevent them from rotating. The hub brake 11 has engaging portions 14 and 15 extending at the top of the hub brake and corresponding to the support portions 6 and 7. The engaging portions 14 and 15 are engaged with the support portions 6 and 7 so that the hub brake 11 is slidable backward and forward relative to the window member 2. The cross sections of the engaging portions 14 and 15 are shaped correspondingly to those of the wedge-shaped openings between the inside surface of the upper half portion 1 of the casing body of the cassette and the support portions 6 and 7 of the window member 2 so that the engaging portions can be fitted in the openings.

As shown in FIGS. 1 and 4, a spring 21 is fitted on a fixed boss 23 on the central part of the front half area of the inside surface of the upper half portion 1 and engaged at both ends of the spring in the notch 22 of the front of the hub brake 11 so that the spring urges the brake toward the rear of the cassette. The bottom of the central portion of the hub brake 11 is flat and flush with the bottoms of the sharp-edged lugs 12 and 13 thereof.

Figure 5:
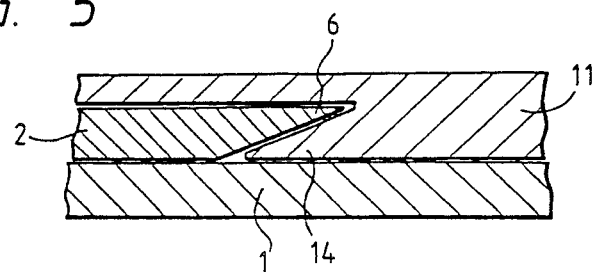
FIG. 5 is a partial sectional view of the cassette taken along a line Y—Y in FIG. 1.

When the magnetic tape cassette is to be assembled, the window member 2 is first secured to the upper half portion of the casing body of the cassette by ultrasonic fuse-bonding, for example. The hub brake 11 is then placed in the upper half portion 1 so that the engaging portions 14 and 15 of the hub brake are located over the notches 16 and 17. The hub brake 11 is thereafter moved toward the rear of the cassette so that the engaging portions 14 and 15 of the brake hub are inserted in between the inside surface of the upper half portion 1 and the support portions 6 and 7 of the window member 2. The hub brake 11 is thus set in the upper half portion 1 of the cassette casing body, as shown in FIG. 5. The ends of the spring 21 fitted on the fixed boss 23 provided on the central part of the front half area of the inside surface of the upper half portion 1 are engaged in the notch 22 of the hub brake 11 to urge the brake toward the rear of the cassette. After the hubs with a magnetic tape wound thereon, a friction sheet, and other required members have been arranged in the upper half portion 1 of the cassette casing body, the lower half portion is coupled to the upper half portion. The assembly of the magnetic tape cassette is thus completed.

During the assembly of the cassette, the hub brake 11 is located at the front half of the inside surface of the upper half portion 1 of the cassette casing body, and is then moved horizontally toward the rear of the cassette. Accordingly, the engaging portions 14 and 15 of the hub brake 11 are easily engaged with the support portions 6 and 7 of the window member 2 so that the hub brake is slidably supported in the upper half portion 1. Therefore, the ease of assembly of the cassette is good.

After the cassette has been assembled, the hub brake 11 cannot be moved up and down relative to the casing body of the cassette, but can only be slid toward the front and rear of the cassette within the prescribed range of operation of the hub brake. Thus, the hub brake 11 is prevented from being elastically deformed. As a result, the sharp-edged lugs 12 and 13 of the hub brake 11 can be surely engaged with the hubs to prevent them from rotating and disengaged from the hubs to release them and allow them to rotate.

The engaging portions 14 and 15 of the hub brake 11 and the support portions 6 and 7 of the window member 2 constitute an engagement structure which engages the inside surface of the upper half portion 1 of the casing body of the cassette and the flat top of the hub brake. This engagement structure cannot come into contact with the side edge of the wound magnetic tape in the cassette to damage the tape or place an unnecessary load upon the running of the tape.

Although the cross sections of the engaging portions 14 and 15 and those of the support portions 6 and 7 are wedge-shaped, the present invention is not limited to this shape as the cross sections of these members may have various forms, for example, an oblong shape, as far as the engaging portions are slidably supported between the inside surface of the upper half portion 1 of the cassette casing body and the support portions.

Moreover, the notches 16 and 17 of the window member 2 are not limited to the above-described forms, but may have other various forms as far as the engaging portions 14 and 15 of the hub brake 11 can be disengaged from the support portions 6 and 7 of the window member when the hub brake is at the front half part of the cassette out of the range of operation of the hub brake, which corresponds to the support portions.

A magnetic tape cassette provided in accordance with the present invention includes a window member secured to the upper half portion of the casing body of the cassette, and a hub brake which can be engaged with the hubs to prevent the latter from rotating and disengaged from the hubs to allow them to rotate. The engaging portions of the hub brake, which are formed thereon at the top thereof, are engaged with the support portions of the window member so that the engaging portions are slidably supported between the upper half portion of the casing body of the cassette and the support portions of the window member. The engaging portions of the hub brake are disengaged from the support portions of the window member when the hub brake is located at the front half part of the cassette out of the range of operation of the hub brake, which corresponds in position to the support portions.

When the cassette is to be assembled, the hub brake is placed in the front half part of the inside surface of the upper half portion of the casing body of the cassette, and then horizontally moved toward the rear of the cassette so that the engaging portions of the hub brake are easily engaged with the support portions of the window member to support the hub brake slidably in the upper half portion of the cassette body. With this arrangement, the cassette is easy to assemble. Moreover, after the cassette is assembled, the hub brake cannot be moved up and down relative to the casing body of the cassette but can only be slid toward the front and rear of the cassette within the range of operation of the hub brake. Thus, the hub brake is prevented from being elastically deformed. As a result, the hub brake can be surely engaged with the hubs to prevent them from rotating and disengaged to release the hubs and allow them to rotate.

Since the engaging portions of the hub brake and the support portions of the window member constitute an engagement structure to engage the inside surface of the upper half portion of the cassette casing body and the top of the hub brake, the bottom of the central portion of the hub brake can be made flat and the engagement structure cannot contact the side edge of the magnetic tape in the cassette. Thus, damage to the tape is prevented and no unnecessary load is placed on the running of the tape.

Accordingly, it is very easy to position the window member and the hub brake relative to each other and to assemble them in the upper half portion of the casing body of the cassette. As a result, the cassette is easy to assemble and the tape runs smoothly.

Figure 7:
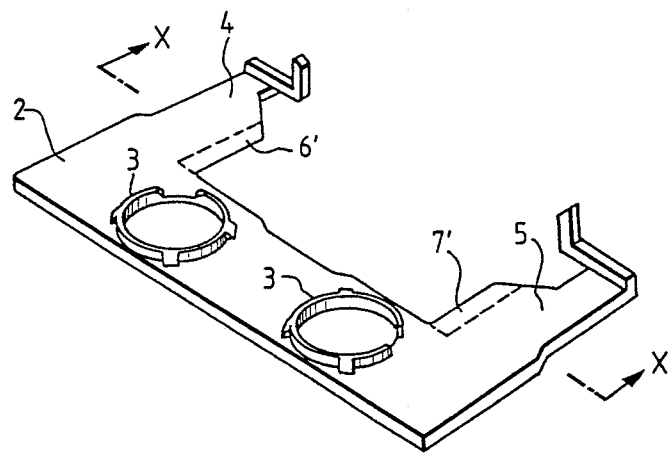
FIG. 7 is a perspective view of the window member of the cassette of FIG. 6.
Figure 8:
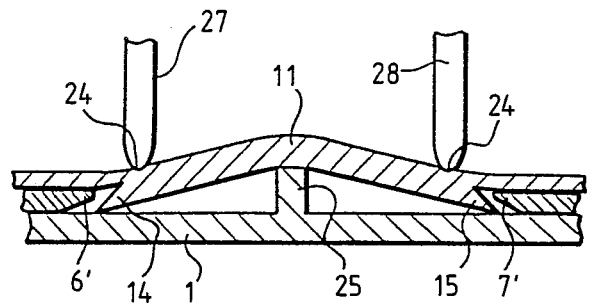
FIG. 8 is a partial sectional view of the hub brake being set in the cassette of FIG. 6.

A further embodiment of the invention will be explained with reference to FIGS. 6–8. In these figures, elements the same or similar to those of the above-described embodiment are identified by like reference numbers.

Figure 6:
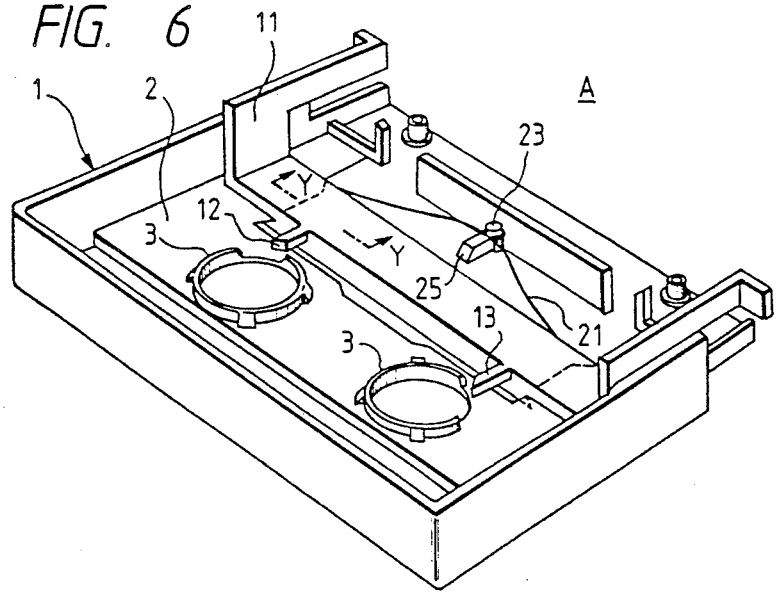
FIG. 6 is a partial perspective view of a magnetic tape cassette of another embodiment of the present invention.

As shown in FIG. 6, a lug 25 shaped substantially as a rectangular parallelepiped is provided on the inside surface of the upper half portion 1 of the cassette casing body, located near the rear of the fixed boss 23, and projecting from the inside surface of the upper half portion 1 toward the inner part of the interior of the cassette. The rear of the lug 25 is sloped. The length of the lug 25, which extends in the front-to-rear direction of the cassette, is appropriately preset so that the hub brake 11 will not be hindered from moving within a prescribed range of operation thereof after being set in a prescribed position. Otherwise, the cassette is the same in construction as the first-described embodiment.

To assemble the magnetic tape cassette, the window member 2 is first secured to the upper half portion 1 of the casing body of the cassette by ultrasonic fuse-bonding, for example, and the hub brake 11 is then placed in the upper half portion 1 so that the hub brake 11 is located over the lug 25. The hub brake 11 is urged toward the inside surface of the upper half portion 1 by pushers 27 and 28 provided at an appropriate distance from each other near the ends of the hub brake, as shown in FIG. 8. At that time, the central portion of the hub brake 11 comes into contact with the bottom of the lug 25 so that the central portion of the hub brake is elastically deformed toward the inner portion of the interior of the cassette As a result, the side edges of the engaging portions 14 and 15 formed on the hub brake 11 at the top thereof near its two ends are oriented obliquely toward the top of the cassette so that the side edges can be inserted in between the upper half portion 1 of the casing body of the cassette and the support portions 6' and 7' of the window member 2. As shown in FIG. 7, the support portions 6' and 7' in this embodiment may be longer than the support portions 6 and 7 in the first embodiment. The hub brake 11 is then moved toward the rear of the cassette while being urged by the pushers 27 and 28 so that the central portion of the hub brake departs from the lug 25 and is then horizontally extended again. At that time, the engaging portions 14 and 15 of the hub brake 11 are inserted between the inside surface of the upper half portion 1 of the cassette casing body and the support portions 6' and 7' of the window member 2 so that the hub brake is set in the prescribed position in the upper half portion 1, as shown in FIG. 5. The bottom of the hub brake 11 has dimples 24 in which the pushers 27 and 28 are fitted to urge the hub brake toward the inside surface of the upper half portion 1, as mentioned above. The ends of the spring 21 fitted on the fixed boss 23 provided on the central part of the front half area of the inside surface of the upper half portion 1 are engaged in the notch 22 at the front of the hub brake 11 to urge the brake toward the rear of the cassette. After the hubs with the magnetic tape wound thereon, a friction sheet, and other elements are assembled in the upper half portion 1 of the casing body of the cassette, the lower half portion thereof is coupled to the upper half portion. The assembly of the magnetic tape cassette is thus completed.

During the assembly of the cassette, the hub brake 11 is located at the front half of the inside surface of the upper half portion 1 of the casing body of the cassette, and is then moved horizontally toward the rear of the cassette while being urged near both the ends of the hub brake by the pushers 27 and 28. Thus, the engaging portions 14 and 15 of the hub brake 11 are easily engaged with the support portions 6 and 7 of the window member 2 so that the hub brake is slidably supported in the upper half portion.

Hence, it can be appreciated that the cassette can be easily assembled.

The shape of the lug 25 provided on the inside surface of the upper half portion 1 of the cassette casing body is not confined to that mentioned above as the lug 25 may have various forms and be coupled to the boss 23 integrally therewith as far as the lug functions to arch the central portion of the hub brake 11 toward the inner portion of the interior of the cassette at the front half part thereof while the hub brake is out of the prescribed range of operation.

A magnetic tape cassette provided in accordance with this embodiment of the invention includes a window member secured to the upper half portion of the casing body of the cassette and supporting a pair of hubs rotatably, and a hub brake whose engaging portions are slidably supported between the upper half portion of the casing body of the cassette and the support portions of the window member so that the hub brake can be engaged with the hubs to prevent them from rotating and disengaged therefrom to release the hubs to allow them to rotate. The inside surface of the upper half portion of the cassette casing body is provided with a lug for arching the central portion of the hub brake toward the inner portion of the interior of the cassette at the front half part thereof when the hub brake is out of the range of operation thereof.

To assemble the cassette, the hub brake is first placed at the front half area of the inside surface of the upper half portion of the casing body and then horizontally moved toward the rear of the cassette while being urged near both ends of the cassette so that the engaging portions of the hub brake can be easily engaged with the support portions of the window member to support the hub brake slidably in the upper half portion of the casing body of the cassette. With this structure, the cassette can be easily assembled. After the cassette is assembled, the hub brake cannot be moved up and down relative to the casing body of the cassette but only slid toward the front and rear of the cassette within the range of operation of the hub brake. Hence, as in the first-described embodiment, the hub brake is prevented from being elastically deformed, and as a result, the hub brake can be surely engaged with the hubs to prevent them from rotating and disengaged to release them.

What is claimed is:

1. A magnetic tape cassette comprising:
upper and lower casing body half portions;
a window member secured to said upper casing body half portion, said window member rotatably supporting a pair of hubs on which a tape is wound, said window member comprising a bearing portion for supporting said hubs, right and left arms extended toward a front of said cassette, support portions being formed by inside edge portions of said arms, and said arms having notches formed therein located at side edges of said arms adjacent said support portions and extending toward right and left ends of said cassette;
a hub brake, said hub brake comprising a pair of lugs engageable with said hubs to prevent rotation of said hubs and disengageable from said hubs to allow rotation of said hubs, and a pair of engaging portions slidably received between said support portions of said window member and said upper casing body half portion for slidably mounting said hub brake, said hub brake being received between said notches of said arms prior to assembly of said engaging portions between said support portions and said upper cassing body half portion; and
spring means for urging said hub brake into engagement with said hubs.

2. A magnetic tape cassette comprising:
upper and lower casing body half portions;
a window member secured to said upper casing body half portion, said window member rotatably supporting a pair of hubs on which a tape is wound;
a hub brake, said hub brake comprising a pair of lugs engageable with said hubs to prevent rotation of said hubs and disengageable from said hubs to allow rotation of said hubs, and a pair of engaging portions slidably received between respective support portions of said window member and said upper casing body half portion for slidably mounting said hub brake;
spring means for urging said hub brake into engagement with said hubs; and
a lug fixed to an inside surface of said upper casing body half portion positioned so as to arch said hub brake during assembly of said hub brake in said upper casing body half portion.

3. A magnetic tape cassette comprising:
upper and lower casing body half portions;
a window member secured to said upper casing body half portion, said window member rotatably supporting a pair of hubs on which a tape is wound;
a hub brake, said hub brake comprising a pair of lugs engageable with said hubs to prevent rotation of said hubs and disengageable from said hubs to allow rotation of said hubs, and a pair of engaging portions slidably received between respective support portions of said window member and said upper casing body half portion for slidably mounting said hub brake;
spring means for urging said hub brake into engagement with said hubs;
a boss fixed on a central part of a front half portion of an inside surface of said upper casing body half portion, said spring means having a central portion fitted on said boss; and
a lug fixed to an inside surface of said upper casing body half portion positioned so as to arch said hub brake during assembly of said hub brake in said upper casing body half portion, said lug being continuous with said boss.

* * * * *